United States Patent [19]
Hyfantis, Jr. et al.

[11] Patent Number: 5,976,377
[45] Date of Patent: Nov. 2, 1999

[54] SYSTEM AND METHOD FOR THE REDUCTION OF THE BIOLOGICAL OXYGEN DEMAND LEVEL OF A FLOWABLE WASTE WATER

[75] Inventors: George J. Hyfantis, Jr., Seymour; James Randall McKennon, Henderson, both of Tenn.

[73] Assignee: Environmental Systems Corporation, Knoxville, Tenn.

[21] Appl. No.: 09/134,459

[22] Filed: Aug. 14, 1998

[51] Int. Cl.⁶ ..................................................... C02F 3/04
[52] U.S. Cl. ......................... 210/614; 210/617; 210/621; 210/150; 210/195.1; 210/241; 210/257.1
[58] Field of Search ..................................... 210/614, 615, 210/617, 621, 629, 150, 151, 194, 195.1, 241, 257.1, 258

[56] References Cited

U.S. PATENT DOCUMENTS

| | | | |
|---|---|---|---|
| 2,200,580 | 5/1940 | Pruss et al. | 210/150 |
| 3,112,261 | 11/1963 | Porter et al. | 210/150 |
| 3,371,033 | 2/1968 | Simmons et al. | 210/150 |
| 4,303,527 | 12/1981 | Reimann et al. | 210/614 |
| 4,351,729 | 9/1982 | Witt . | |
| 4,411,780 | 10/1983 | Suzuki et al. | 210/195.1 |
| 4,764,272 | 8/1988 | Fox . | |
| 4,931,183 | 6/1990 | Klein et al. | 210/614 |
| 4,999,103 | 3/1991 | Bogart | 210/241 |
| 5,019,268 | 5/1991 | Rogulla | 210/617 |
| 5,156,742 | 10/1992 | Strueming | 210/151 |
| 5,259,931 | 11/1993 | Fox | 210/150 |
| 5,352,357 | 10/1994 | Perry | 210/195.1 |
| 5,620,891 | 4/1997 | Drummond et al. . | |
| 5,674,399 | 10/1997 | Davis . | |
| 5,733,454 | 3/1998 | Cummings . | |

*Primary Examiner*—Christopher Upton
*Attorney, Agent, or Firm*—Pitts & Brittian, P.C.

[57] ABSTRACT

A system for the treatment of waste water including hydrocarbons and of a high biological oxygen demand. Preferably, the system includes a portable platform suitable for transport from site to site. A reaction vessel defining a substantially vertically oriented flow path therethrough for flowable waste water is mounted with its lower portion within and surrounded by a collection basin which receives waste water for treatment and recycling via trickling down through a biomass disposed on packing material within the reaction vessel. Simultaneously with the trickle down of the waste water, ambient air is forced upwardly countercurrent to the flow of the waste water to provide oxygen to the biomass, to enhance the flow of waste water over the biomass, and to sweep gaseous products from the reaction vessel. Optionally, oxygen is introduced into the collection basin to enhance biodegradation reactions within the collection basin. The system may be operated in either batch mode or continuously. A method is disclosed.

19 Claims, 6 Drawing Sheets

SYSTEM AND METHOD FOR THE REDUCTION OF THE BIOLOGICAL OXYGEN DEMAND LEVEL OF A FLOWABLE WASTE WATER

BACKGROUND OF INVENTION

This invention relates to the treatment of relatively small volumes of waste water of a high biological oxygen demand so that the waste water permissibly can be discharged into a natural flowing stream or the like, and wherein the system therefor is readily transportable from site to site.

Transportable waste water treatment systems for the removal of entrained hydrocarbon gases from waste water have been employed in specific situations, such as in the degassing of gasoline contained in a pond of water or the like. These systems function by moving large volumes of air through a downwardly flowing stream of the gas/water mixture so that the gas vapors are entrained in the flowing air and swept from the mixture. There is no conversion or degradation of the hydrocarbons in these systems.

U.S. Pat. No. 4,351,729 discloses a technique directed to the anaerobic bacterial conversion of organic pollutants to mainly carbon dioxide and methane. To this end, in accordance with this patent, the waste water is flowed downwardly through a packing material contained in a sealed vessel, the packing material carrying an anaerobic bacteria biomass. Air and other sources of molecular oxygen are excluded from the vessel. Carbon dioxide and methane produced by the reaction within the vessel or from external sources flow upwardly through the biomass on the packing material to be eventually exhausted from the top end of the vessel. The system of this patent is useful only for an anaerobic bacterial conversion process. The liquid effluent ("outfall") from the vessel is stated to be suitable infeed to an aerobic digester.

U.S. Pat. No. 5,674,399 discloses a sewage treatment system and method which employs a settling tank containing an activated sludge plus a submerged biofilm filter. The tank is filled with a batch of liquid sewage. This liquid is continuously circulated through the biofilm filter and the settling tank until the batch has been treated sufficiently t permit its disposal. Upon completion of a treatment cycle, a portion of the liquid is removed from the tank, leaving a portion of the liquid and the activated sludge in the tank. The activated sludge and the biofilm are sources of microbes for digesting each batch of sewage which is admitted to the tank. If the flow rate of the incoming sewage is low enough, this system can be operated as a continuous system, but only at low throughput rates. Disruption of the activated sludge and its microbial population are be avoided, so that the movement of the liquid into the tank initially, and during recirculation of the liquid through the biofilm filter are to be carefully controlled. This feature places a limit on the usefulness of this and similar systems.

Other biological degradation systems include the use of lagoons where the waste water is allowed to remain in the presence of bacteria for long periods of time. These systems require inordinate times and volumes of stored waste water, hence are costly. Moreover, in these systems, the waste water must be transported to the lagoon site.

Digesters are another system which has been employed in the degradation of organics in waste water. These systems generally comprise a submerged biomass through which waste water is repeatedly recycled to effect aerobic treatment of the waste water. Basically, a digester is a form of lagoon in which the waste water is recycled. The digester merely concentrates the biomass into a smaller volume.

It is an object of the present invention to provide a compact transportable system for reducing the biological oxygen demand (BOD) of waste water to a permissible level for ready disposal of the waste water. Under certain circumstances, it is another object to provide a compact fixed system of the type described. Another object is to provide for reduction of the chemical oxygen demand (COD) of waste water, either in combination with, or in addition to, the reduction of biological oxygen demand of the waste water.

Another object is to provide a method by which the biological oxygen demand of waste water is reduced to a permissible level for ready disposal of the waste water.

SUMMARY OF INVENTION

In accordance with the present invention there is provided a system for the treatment of flowable waste water of a high biological oxygen demand (BOD) to reduce its ROD to an acceptable level for discharge in accordance with accepted procedures. In the system of the present invention, the waste water is flowed downwardly through a trickle down reaction vessel containing a biomass cultivated on packing material contained within the reaction vessel, while ambient air is simultaneously flowed counter-currently upwardly through the reaction vessel. Effluent from the reaction vessel is mixed with the waste water and the mixture is recycled through the reaction vessel. The system includes a reaction vessel having an upper portion, a lower portion and an intermediate portion. The lower portion of the reaction vessel is disposed within an open-top collection basin which is mounted on a transportable base for ready transporting from site to site. The collection basin serves to receive waste water and as a mixing vessel for effluent from the reaction vessel and the waste water. The present system may be operated in a batch mode or a continuous flow mode. Progression of the reduction in the BOD of the flowable liquid within the collection basin may be monitored and when such BOD falls within a preselected range of BODs, liquid is discharged from the collection basin and additional waste water is added to the basin. The present system offers the advantage of continuous movement of a well-distributed, relatively small flow volume of the waste water over the biomass on the packing material to enhance the degree of exposure of the hydrocarbon-containing organic contaminants in the waste water to the biomass, hence more effective degradation of the hydrocarbons during each pass of the waste water over the biomass. Further, there is provided the advantage of the counter-current flow of ambient air through the biomass to provide oxygen feed to the biomass, to enhance distribution of the downwardly flowing waste water over the packing material, and to sweep gaseous hydrocarbons and/or gaseous byproducts of the bacterial degradation of the hydrocarbons in the waste water, out of the reaction zone and out of the reaction vessel itself. Further, the present system provides for the aeration of the liquid contained within the collection basin as desired, without concern for disturbance of an activated sludge layer or the like.

DETAILED DESCRIPTION OF INVENTION

Figure 1:
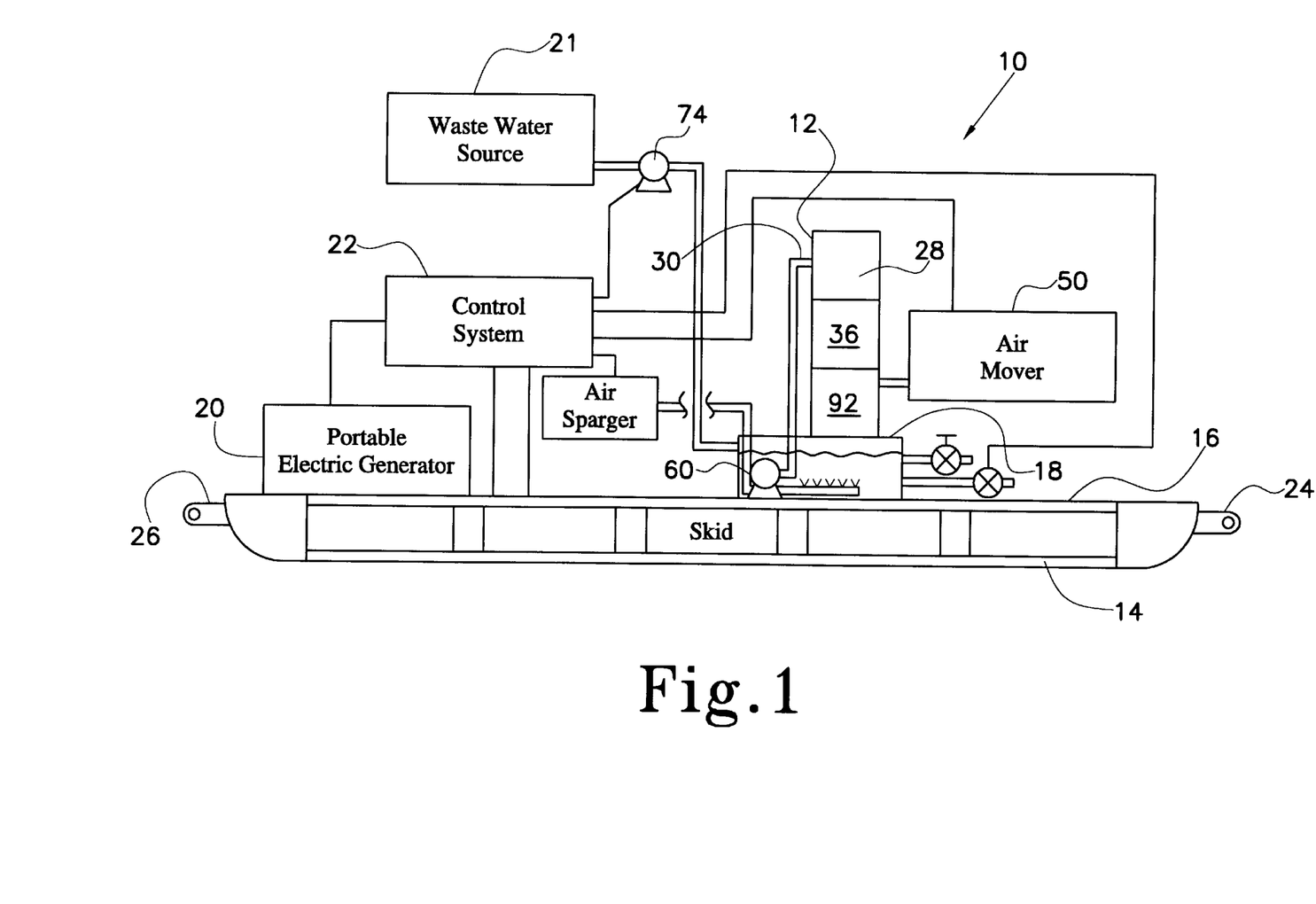
FIG. 1 is a schematic representation of a system embodying various features of the present invention.

In FIG. 1, there is depicted one embodiment of a transportable system indicated generally by the numeral 10, that includes various of the features of the present invention. The depicted system includes a upright reaction vessel 12 defining a substantially vertically oriented path of travel for a plurality of flowable reactants counter-currently therethrough. The term "reactants" is used herein in the sense of a material which includes an ingredient that is to provide a chemical or biological action or upon which a chemical or biological action is performed, as opposed to a "true" chemical reactant. A reactant, however, may be involved in a true chemical reaction. In the present invention, the flowable reactants include waste water which includes hydrocarbons that are desirably to be removed, degraded, converted or otherwise rendered relatively innocuous with respect to their ready disposal in an environmentally acceptable manner. These flowable reactants further include air, the oxygen content of which is useful in promoting growth of a biomass, for example.

Referring to FIG. 1, one embodiment of the system 10 of the present invention comprises a skid 14 having an upper planar platform 16 onto which there is mounted an open-top collection basin 18, a portable generator 20 (optional) and a control system 22. The skid may be provided with lugs 24,26 at each of its opposite ends to which a chain or the like may be attached for pulling the skid from site to site over short distances. For transport between distant sites, the skid may be loaded onto a conventional trailer. As desired, the present system may be operated while the skid remains on a trailer.

Figure 2:
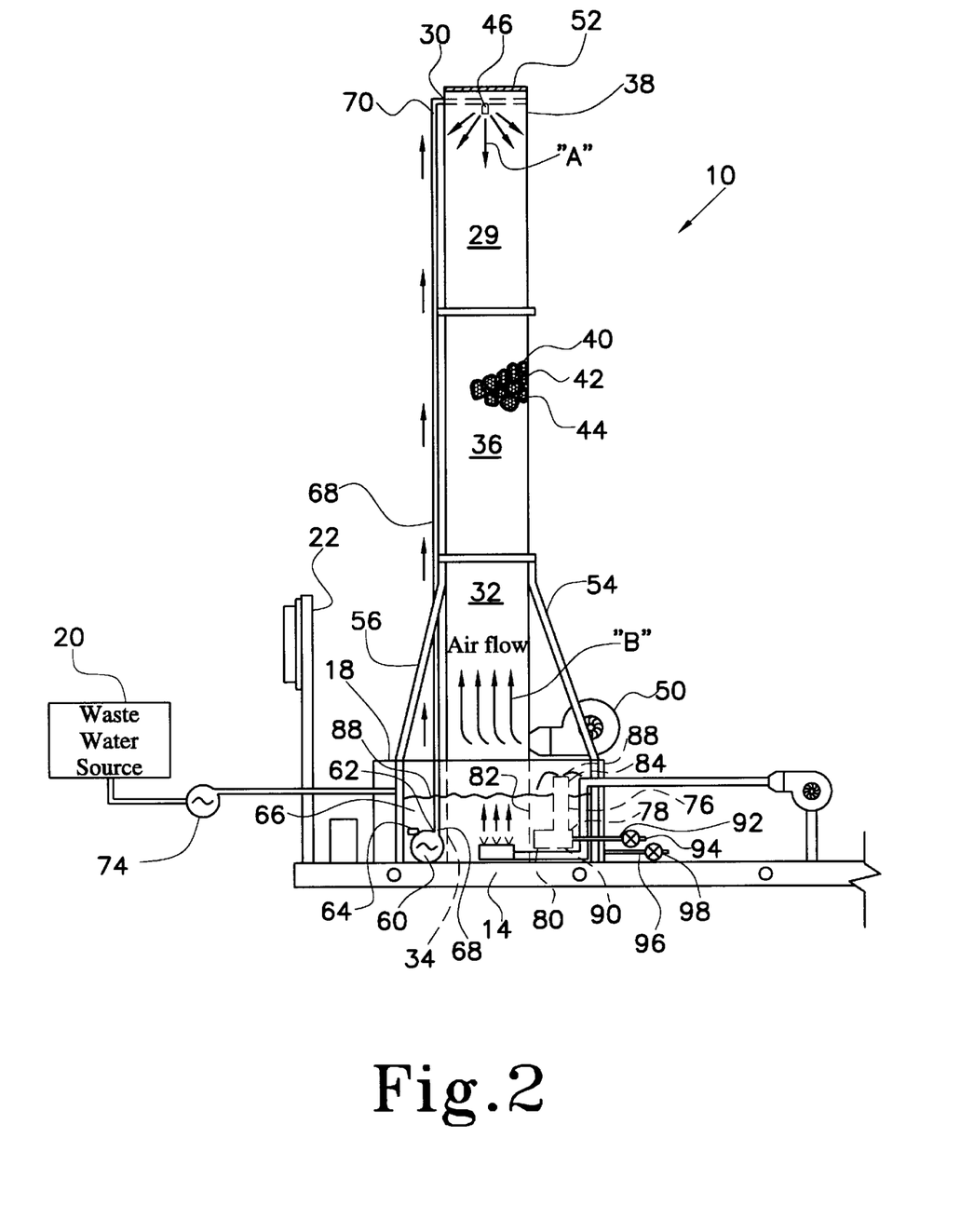
FIG. 2 is a schematic representation of one embodiment of a portion of a system as depicted in FIG. 1.
Figure 3:
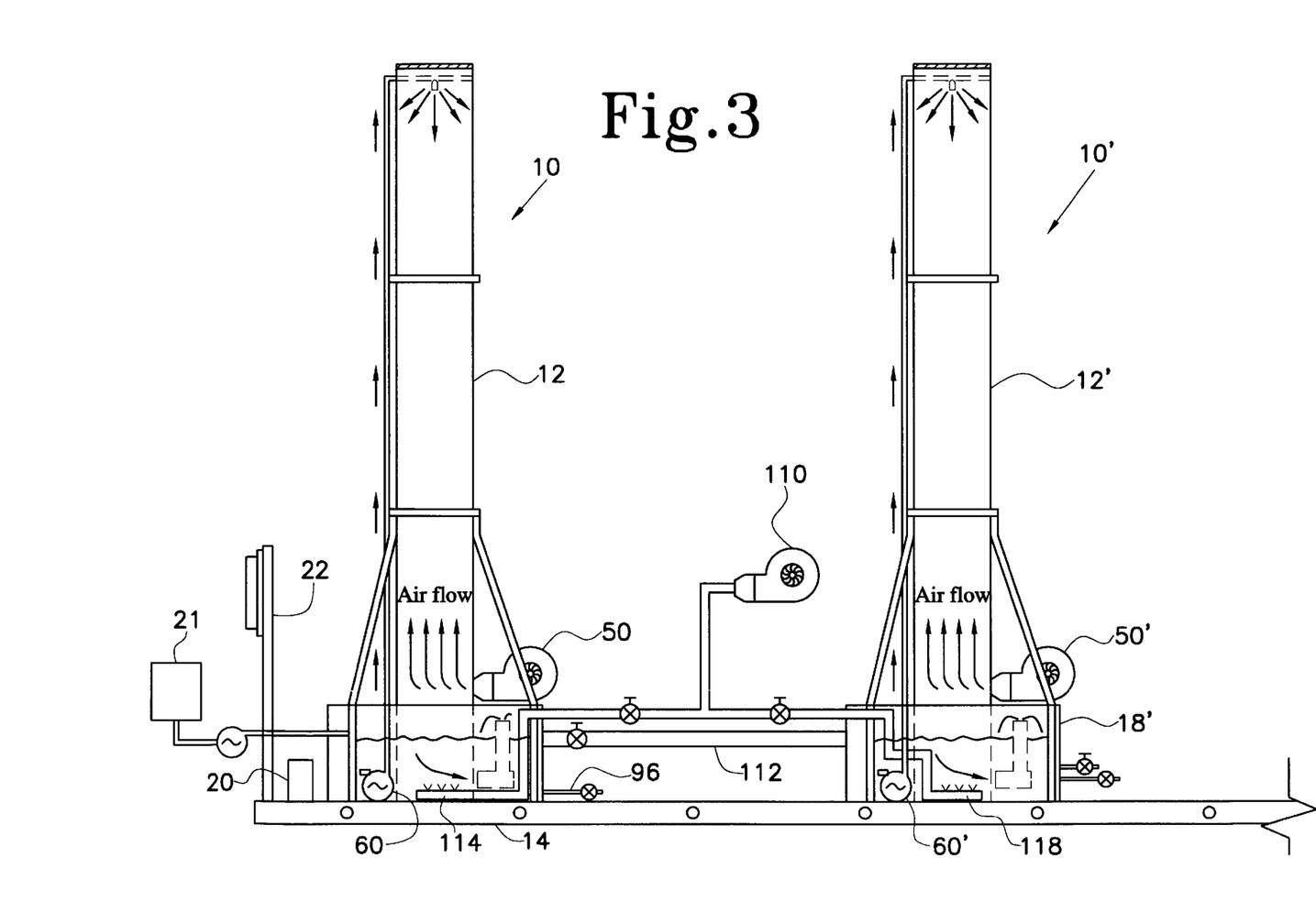
FIG. 3 is a schematic representation of one embodiment of a system in accordance with the present invention and employing dual reaction vessels and collection basins.

The embodiment depicted in FIGS. 1 and 2 further includes a reaction vessel 12 having an upper portion 28 including an inlet 30, a lower portion 32 having a bottom end 34, and an intermediate portion 30. In the preferred embodiment, the bottom end of the lower portion of the reaction vessel is mounted inside the collection basin.

With further reference to FIG. 1 and specific reference to FIG. 2, the depicted, and preferred, reaction vessel 12 includes an upper portion 28 having a top end 38, a lower portion 32 having a bottom end 34, and an intermediate portion 36. Within at least the intermediate portion 36, the reaction vessel contains a quantity of discrete elements 40 of a packing material 42. This packing material 42 is essentially chemically and biologically inert in the present system. The surfaces of these elements 40 of packing material are provided with a biomass 44, which in the present invention comprises an aerobic microorganism, preferably a bacteria, capable of degrading or decomposing the hydrocarbons in the waste water being treated.

Adjacent the top end 38 of the upper section 28 of the reaction vessel the present system includes an inlet 30 through which flowable waste water is introduced to the interior of the reaction vessel. The depicted inlet terminates in the form of a distribution head 46 which distributes the incoming waste water about the interior of the upper portion of the reaction vessel, preferably in the form of a mist as indicated by the arrows "A". As will be further noted hereinafter, this flowable waste water trickles down through the biomass on the packing material to expose the hydrocarbons contained within the waste water to the biomass so that the microorganisms of the biomass can consume at least a portion of the hydrocarbons in the waste water.

Whereas the hydrocarbons contained within the waste water serve as "food" for the microorganisms, the microorganisms, being aerobic, further require oxygen for their survival and growth. Oxygen absorbed within the waste water is, at best, of a limited volume and insufficient to provide the required or desired volume of oxygen for use by the microorganisms in their decomposition of the hydrocarbons in the waste water. This is especially true when the BOD of the waste water is a high level, for example, above about 1000 ppm. Further, restriction of the volume of oxygen available to the microorganisms in the biomass will deter the rate of growth of the microorganisms in the biomass, to the extent that the biomass may become ineffective. In the present system, this oxygen requirement of the biomass is supplied by means of an air mover 50 which is associated with the lower portion 32 of the reaction vessel. A preferred air mover draws ambient air from outside the reaction vessel and forces the same into the reaction vessel (see arrows "B") and upwardly through the packing material and its associated biomass, counter-current to the trickling down of the waste water. As the air moves through the biomass, it becomes available to the microorganisms in the biomass. Air in excess of that which is needed to supply oxygen to the biomass tends to retard the downward flow of the waste water through the biomass, thereby enhancing the time period over which the hydrocarbons in the waste water are exposed to the biomass. Further, the upwardly flowing air serves to sweep volatile compounds and/or gaseous products, including gas entrained in the waste water and/or gaseous byproducts from the decomposition of the hydrocarbons in the waste water, out through a discharge outlet 52 in the top end of the reaction vessel.

Referring still to FIGS. 1 and 2, the depicted reaction vessel is supported in its upright orientation with its bottom end 34 disposed within a collection basin 18 which fully surrounds at least a portion of the lower portion of the reaction vessel. Lateral braces 54, 56 provide both vertical and horizontal support to the reaction vessel within the collection basin. This mounting of the reaction vessel provides for the rigidity required between the reaction vessel and the collection basin when the present system is transported from site to site. Further to this end, the collection basin is mounted on a carriage, such as a skid 14, which is readily dragged from site to site over short distances, or readily pulled onto a transport vehicle for movement between distant sites.

In FIGS. 1 and 2, there is also depicted a pump 60 having an outlet 62 and an inlet 64, this inlet 64 being in fluid flow communication with flowable waste water 66 contained in the interior of the collection basin. The outlet of the pump is connected to one end 68 of a conduit 70 which leads from the pump upwardly of the reaction vessel and having its opposite end 70 connected to the inlet 30 into the top end of the upper portion of the reaction vessel, thereby providing for fluid flow communication between the interior of the collection basin and the upper portion of the reaction vessel.

The interior of the collection basin is further connected in fluid flow communication with a source 21 of waste water containing hydrocarbons and of a high BOD, by means of a conduit 72. A pump 74 is interposed along the length of the conduit to provide motive force for the transfer of flowable waste water 66 from the source 22 and into the collection basin 18.

Control means 22 which may include a programmable computer module or the like as is well known in the art, is provided for the exercise of control over the operation of the pumps 60 and 74. This sane control means may be employed to effect operational control over the air mover 50 and/or other operational features of the present system as will appear more fully hereinafter.

In the embodiment depicted in FIGS. 1 and 2, the lower portion 32 of the reaction vessel is provided with a discharge outlet 76 for the effluent from the reaction vessel. The depicted discharge outlet is in the form of a tee, the short leg 78 of which is connected at one of its ends 80 to the side wall 82 of the lower portion of the reaction vessel and extends horizontally therefrom. The long leg 84 of the tee is oriented uprightly from the short leg and terminates at its upper end 86 at a horizontal level above the level of liquid 88 disposed within the collection basin so that any effluent flowing from the reaction vessel through this discharge outlet is sprayed over the surface of the liquid within the collection basin. The opposite end 90 of the short leg of the tee is connected by a conduit 92 to a sampling port 94 adjacent the side wall of the collection basin.

Further, the collection basin is provided with a drain line 96, including a valve 98, for use in draining or S withdrawal of liquid from the collection basin as desired. In one embodiment, the collection basin is cylindrical and about five feet in diameter, the reaction vessel is also cylindrical, about three feet in diameter, and about eleven feet in length. The internal volume of the reaction vessel is therefore approximately 75 ft$^3$. A suitable air mover for use with this embodiment of the reaction vessel is capable of moving ambient air into the reaction vessel at the rate of at least about 50 ft$^3$/minute (cfm). The capacity of the pump 60 for this embodiment is suitably about 30 gal/min. (gpm). As desired, sparging air may be introduced into the liquid contained within the collection basin as by means of an air blower 110, conduits 112, 116 and distributors 114, 118, to aerate the liquid within the collection basin. One suitable air blower for use with this embodiment is capable of moving air at the rate of at least about 10 cfm.

Figure 5:
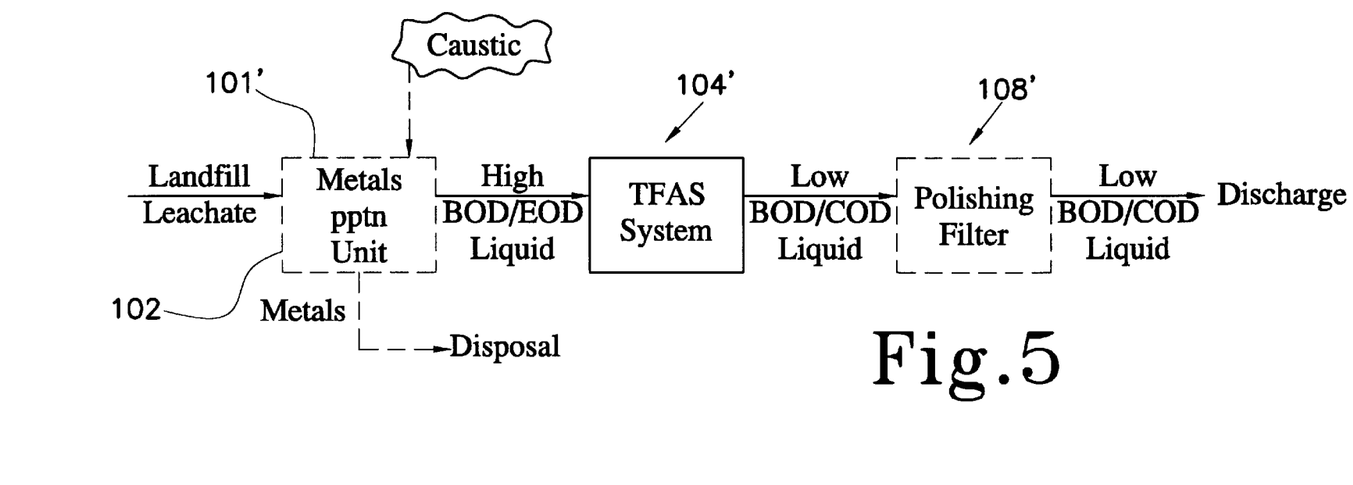
FIG. 5 is a schematic representation of a further embodiment of a method for the reduction of the biological oxygen demand of a waste water and embodying various of the features of the present invention.

As depicted in FIG. 5, as desired, a further system 10' may be mounted on the skid 14 so that this further system is transportable from site to site along with the first system. This further system includes a reaction vessel 12' which may be essentially a duplicate of the reaction vessel 12, including an associated further collection basin 18', a further air mover 50', a further pump 60' for moving liquid from the collection basin to the upper end of the further reaction vessel. As desired, the further system may be connected in fluid flow communication with the drain line 96 from the collection basin of the first system, or it may be connected in fluid flow communication directly with the source of waste water 21. In the latter event, the further system includes a further pump 60' for the movement of waste water from the source into the further collection basin. Operational control over the further system preferably is included within the control means 22, but may comprise a separate and independent further control means.

Figure 7:
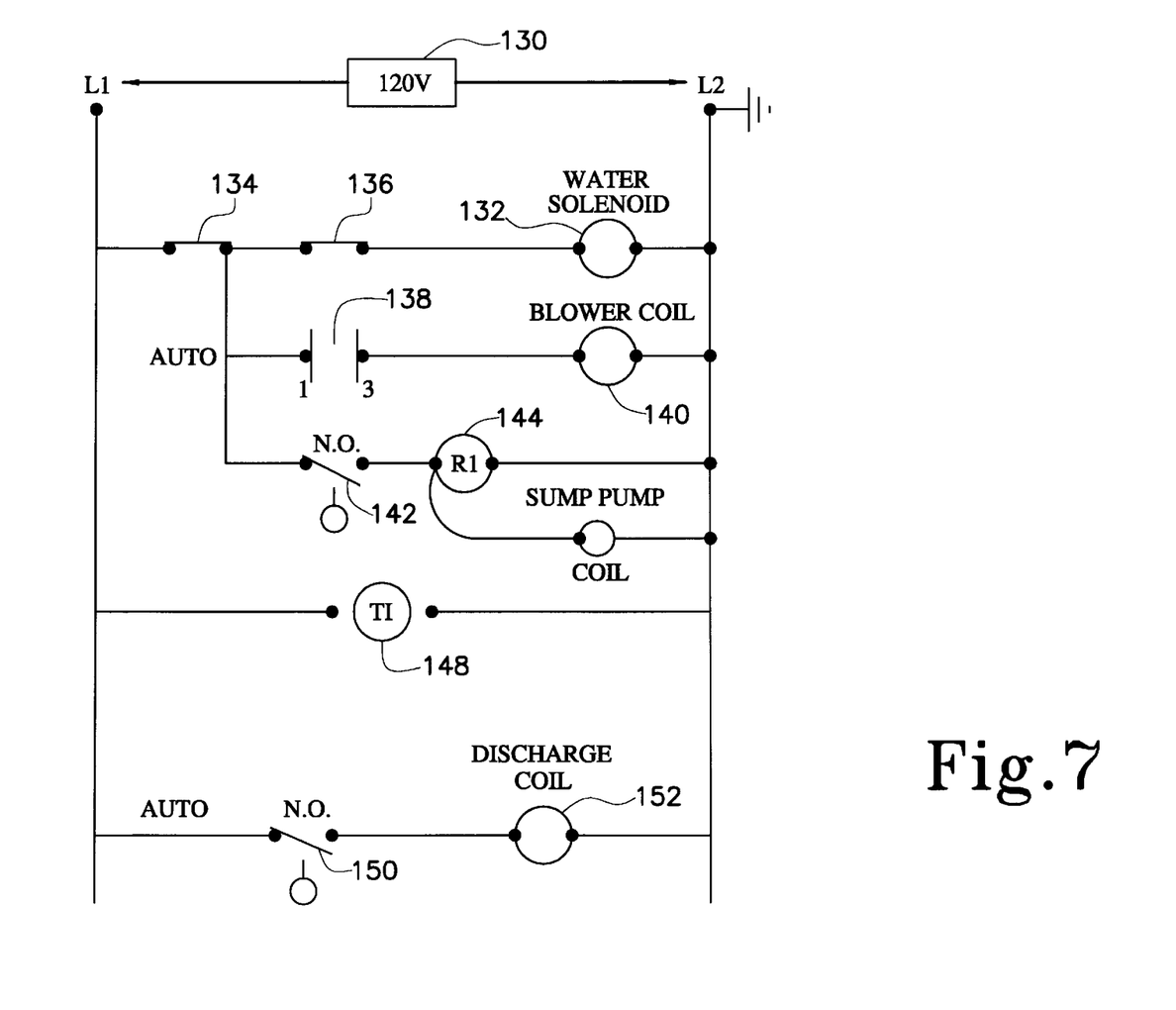
FIG. 7 is a schematic diagram of one embodiment of a control system for the system of the present invention.

One suitable control system for the embodiment depicted in FIGS. 1 and 2 is depicted diagrammatically in the ladder diagram of FIG. 7. The depicted control system includes lines L1 (high side) and L2 (common/ground side) from a source 130 of 120 volts electrical power. Across these lines there are connected a solenoid 132 which serves to control the functioning of the pump 74, hence the flow of infeed waste water to the collection basin 18. Connected in series with the solenoid 132, there is provided an "start/stop" switch 134 and a further switch 136. When switch 134 is closed, the system is powered in its "automatic" operating mode. Closure of switch 134 and closure of switch 136, which is operative in response to the level of liquid within the collection basin, activates the solenoid 132 to cause waste water to flow into the collection basin 18. Conversely, upon the level of liquid in the collection basin falling below a preset level, the switch 136 opens, stopping the infeed flow of waste water to the collection basin.

Connected between the switch 134 and L2 is a timer 138 and the coil 140 of the air mover 50. Another leg of the control system includes a "normally open" switch 138 (what type of switch?) connected between the switch 134 and a relay 144 that is interposed between L2 and the coil of the circulation pump 60 so that upon the closure of switch 142, the circulation pump 60 is activated to circulate liquid from the collection basin to the top end of the reaction vessel 12. A timer connected between L1 and L2 below the afore-described automatic elements of the control system, controls the time within which there is current flowing between L1 and L2 that is available for powering of the automatic elements, hence the time within which the control system is operative. Discharge of liquid from the collection basin through the discharge line 96 is controlled by a manually operative, normally-open switch 150 connected in series with the coil of the solenoid valve 98 interposed along the length of the discharge conduit 96 leading from the collection basin 18.

In the instance where two systems are operated from the depicted control system, a further switch may be interposed between switch 136 and the solenoid 132 if it is desired that the waste water infeed to the respective collection basins of the two systems be independently controlled.

Figure 4:
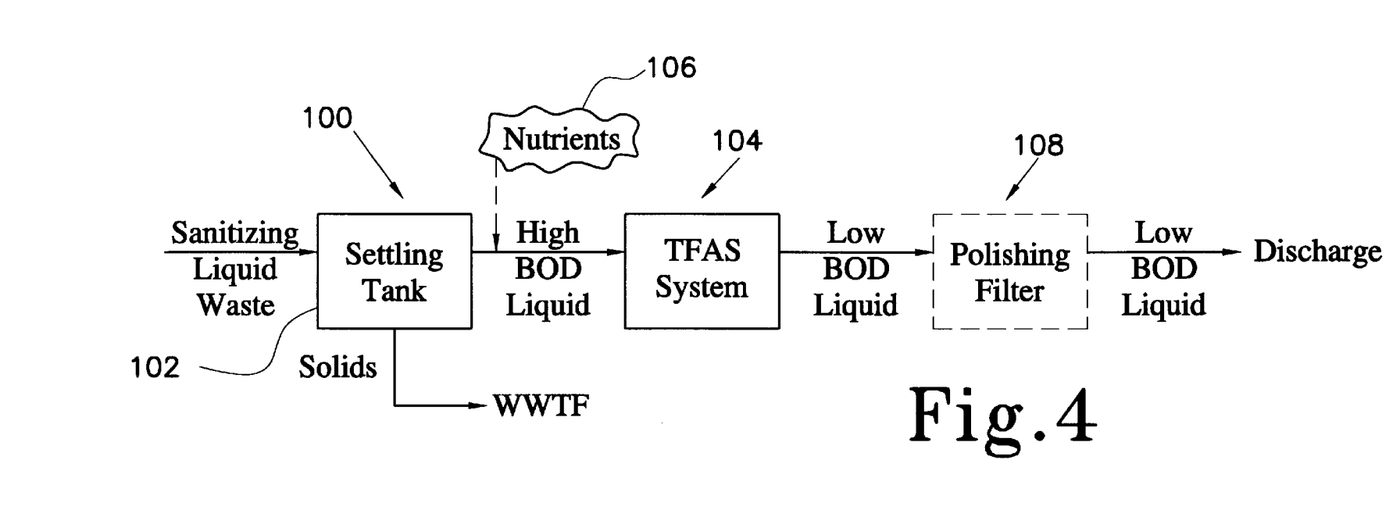
FIG. 4 is a schematic representation of one embodiment of a method for the reduction of the biological oxygen demand of a waste water and embodying various of the features of the present invention.

The system of the present invention preferably comprises one stage in an overall method for treatment of a given waste water having a high BOD level. For example, one such overall method for the treatment of sanitary liquid waste (sewer effluent from a residence or group of residences, for example) as depicted in FIG. 4 may include a stage 100 in which the liquid waste is initially fed into a settling tank 102 where the larger solids in the waste are allowed to settle out by gravity. The solids collected in the settling tank may be periodically removed and disposed of in any acceptable manner. The supernatant liquid from the settling tank, with some dissolved and smaller suspended solids, can become the source for infeed into the collection basin of the system 10 depicted in FIG. 1, for example as a further stage 104. This supernatant liquid is high in BOD (e.g., has a BOD of 5000 ppm or greater). As needed, nutrients 106 for the biomass contained within the reaction vessel may be added to the supernatant liquid from the settling tank. Following treatment of the liquid waste within the reaction vessel, the effluent from the collection basin, which is now of a low BOD level which is at least about 80% less than its original BOD level, may optionally be processed through a polishing filter stage 108 in which any remaining solids in the effluent are removed. The effluent from this polishing filter stage is suitable for discharge into a sanitary sewer or a natural flowing stream, for example.

FIG. 5 depicts a method for the treatment of landfill leachate employing the system 10 and method of the present invention. The depicted method of FIG. 5 includes substantially the same stages 100', 104', 108' of treatment as depicted in the method of FIG. 4 except that the landfill leachate normally contains metal values which must be removed from the leachate. In the depicted method, this removal of metal values is at least partially carried out by a caustic treatment of the leachate in the set-ling tank stage 100'. This caustic treatment precipitates the heavy metals, the precipitated solids thereafter being withdrawn from the settling stage and disposed of in an acceptable manner. It is to be noted that the liquid leachate also exhibits a high chemical oxygen demand (COD). This factor has no adverse effect upon the subsequent treatment of the liquid leachate within the reaction vessel of the present invention, so long as the liquid leachate does not contain a chemical moiety which is destructive to the biomass in the reaction vessel. The treated liquid leachate effluent from the polishing filter stage of this embodiment may be discharged into a sanitary sewer or naturally flowing stream.

In either of the above examples for the treatment of residential sewer waste or landfill leachate, it is to be noted that the present system is readily transportable from site to site, either by sliding the skid from site to site or by loading the skid onto a trailer for movement from site to site. In either event, the present system is self-contained and requires only a source of waste water and a suitable effluent discharge environment in order for the system to be operational. As needed, the present system is provided with a portable power generator 20 which is mounted on, and movable with, the skid for providing electrical power to the system in the event there is no existing source of electrical power available at a given site.

Thus, it will be recognized that the method or process of the present invention comprises the steps of providing a treatment system, including all of the elements necessary for its operation, on a portable platform, feeding a flowable waste water from a source of the waste water into the collection basin of the system, conveying waste water from the collection basin to the upper portion of the reaction vessel and distributing the same into the upper portion of the reaction vessel whereupon the waste water is caused to trickle downwardly through the biomass contained within the intermediate portion of the reaction vessel, simultaneously introducing ambient air into the reaction vessel at a location below the biomass so that air flows upwardly, and countercurrent to the flow of the waste water, through the biomass, thence out of the upper portion of the reaction vessel, carrying with it gaseous material which is swept from the waste water or the gaseous byproducts of the biological action of the biomass on hydrocarbons contained within the waste water. Further, the method may include the steps of monitoring the BOD of the effluent from the lower portion of the reaction vessel, comparing this BOD to a standard range of BODs which are acceptable for disposal in a sanitary sewer or naturally flowing stream, and either readmitting the effluent to the collection tank for recycling with the waste water, through the reaction vessel, or discharging the effluent (or some portion or all of the liquid mixture of waste water and effluent from the reaction vessel) from the collection basin to a further treatment stage, to a further system, or to a storm sewer or the like. The system may be operated in a batch mode wherein a quantity of waste water is initially fed into the collection basin and recycled through the reaction vessel until its BOD is at an acceptable level, or continuously wherein there is continuous addition of waste water to the collection basin, continuous recycling of the flowable contents of the collection basin through the reaction vessel, and continuous withdrawal of flowable material from the collection basin. In the latter mode, the flow rates of infeed waste water, the flow rate of liquid through the reaction vessel, and the withdrawal flow rates are coordinated to provide adequate time of the waste water within the reaction vessel as will result in reduction of the original BOD level of the waste water to an acceptable level of BOD.

It will be recognized that when employing one or more reaction vessels in series, one may employ a first type of microorganism in the first reaction vessel, and a further type of microorganism in the second reaction vessel, and so on in each succeeding reaction vessel in the chain. Because of the ready transportability of the present system, one does not encounter inordinate costs or time expended in providing at a given site that system which is most suitable for treatment of a given waste water having diverse hydrocarbons contained therein.

Transportability of the present system is enhanced by reason of the reaction vessel being mounted within the collection basin. First, this "nesting" of the reaction vessel and collection basin reduces the area required for mounting these two components on a skid where space is at a premium. Further, when the basin contains waste water, the liquid-containing basin functions to lower the center of gravity of the reaction vessel and thereby aid in stabilizing the reaction vessel during operation. Still further, because the bottom end of there reaction vessel is disposed beneath the level of waste water contained within the collection basin, the effluent from the reaction vessel may be discharged directly into the collection basin employing a gravitationally-operated means for controlled discharge of effluent from the reaction vessel into the collection basin for ready mixing of the effluent with whatever liquid is present within the collection basin, such as waste water or a mixture of waste water and previously added effluent from the reaction vessel.

In a preferred embodiment, the rate of recirculation of the liquid from the collection basin through the reaction vessel is variably controllable to accommodate waste waters of varying degrees of organic contamination. To this end, the flow of liquid from the collection basin to the top end of the reaction vessel is selectable by selecting the flow rate generated by the operation of the pump 60.

In a specific example, the present system and method were employed to continuously treat a slip stream of sewage plant liquid primary effluent. In this example, there were two systems connected in series. The two reaction vessels were essentially identical in size and each was loaded in its intermediate portion with a packing material identified as Q-PAC®, an inert, high surface area polypropylene packing material sold by LANTEC Products, Inc. The packing material of each reaction vessel was provided with a biomass of zoogleal slime. Following assembly and check out of the system at the manufacturing plant, it was loaded onto a trailer and transported to the test site.

In the present example, the biomass was developed from the sewage plant liquid primary effluent itself by recycling the effluent through each reaction vessel for a period of about seven days. As desired or needed, developing and culturing a biomass may be accomplished by recycling a synthetic "starter feed" prior to system deployment. The stream of waste water from the sewage plant was fed into the collection basin of the first system at the rate of two gallons per minute. Liquid from the collection basin of the first vessel was allowed to flow by gravity through an interconnecting conduit 112 into the collection basin of the second vessel. Thus, both incoming untreated waste water, mixed with partially treated liquid from the first reaction vessel, served as the infeed stream to the second vessel. In the present example, the liquid within each collection basin was recirculated through a respective reaction vessel at the rate of six gallons per minute. Air flow at a rate of 50 cfm was admitted to the intermediate portion of each of the reaction vessels at a level below the packing material. These systems were operated continuously for about 90 days for a total throughput of about 250,000 gal of the sewage plant liquid primary effluent.

Figure 6:
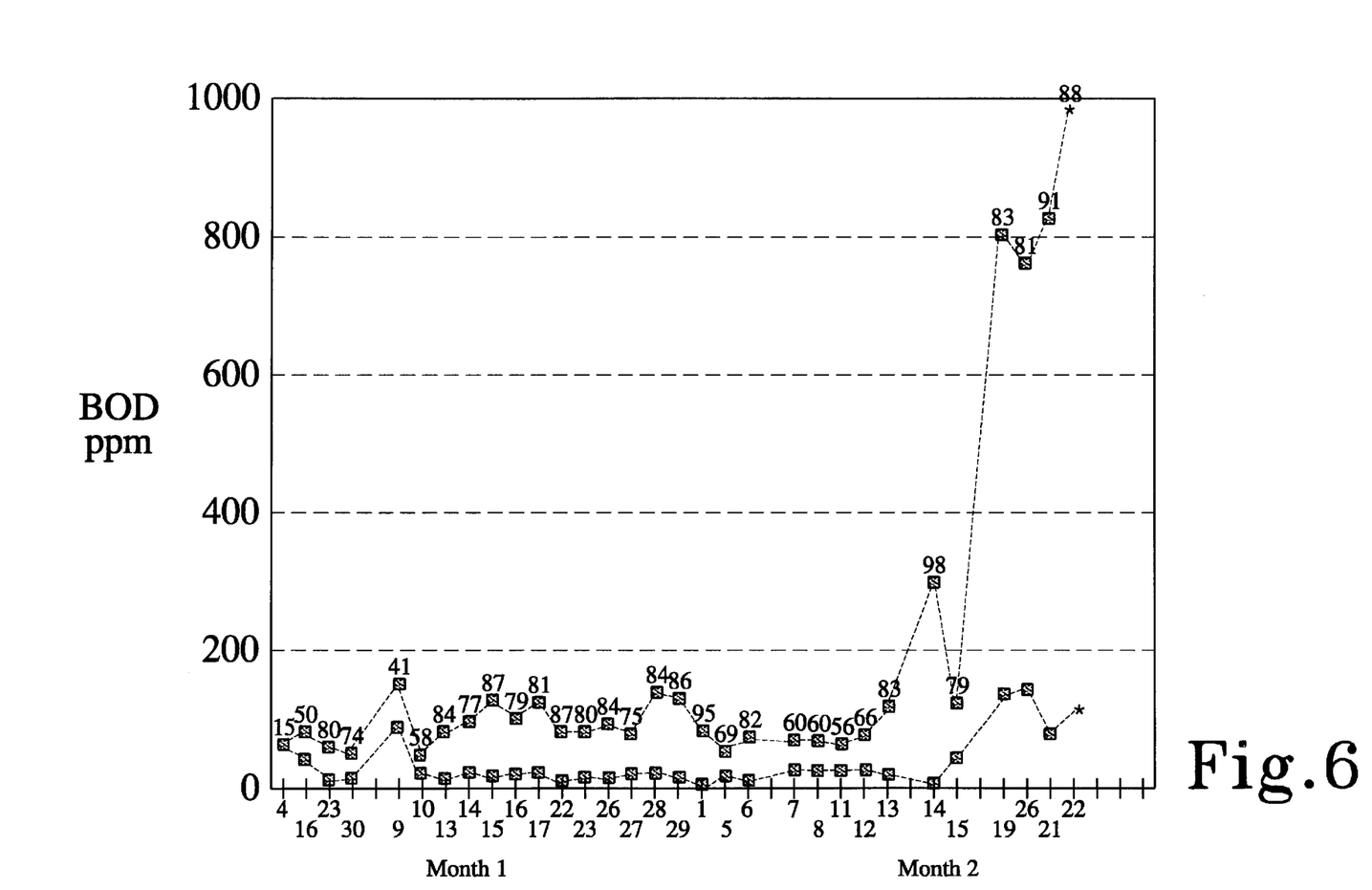
FIG. 6 is a graphic representation of one example of the treatment of waste water of a high biological oxygen demand and depicting the extent of reduction in such biological oxygen demand through the use of the system and method of the present invention.

A sample of the sewage plant liquid primary effluent was taken initially and periodically during the specific example testing. In like manner, a sample was taken of the liquid contents of the collection basin of the second system at the same times that samples were taken from the sewage plant stream. These samples were analyzed for their BOD level. FIG. 6 is a graphic representation of the results of these analyses. Over this time period of operation of the systems of this example, there was demonstrated a reduction in BOD level of the waste water feed stream of greater than 80%, and as high as 98%. Extrapolation of the data obtained from this example indicate that liquid waste streams with BOD/COD levels of about 300 ppm can be sufficiently treated in a two-system trickling down/air stripper combination to meet the typical National Pollution Discharge Elimination System (NPDES) BOD standards for environmentally acceptable disposal. In initial testing of the present system, the waste water had a relatively low BOD level so that sugar was added to the primary effluent infeed during a portion of the testing to increase the BOD level of the infeed stream to about 1000 ppm.

At the test site, in the example given above, the system was initially set up to receive the slip stream of waste water from the clarifier overflow trench of a sewage treatment plant. After operation of the system at this site for a few weeks, the system was transported several hundred feet to a location adjacent a thickener pond at the same sewage treatment plant. The system functioned satisfactorily at both sites and demonstrated its ability to survive transport over long and short distances.

Whereas the present invention has been described in certain instances in specific terms for clarity and understanding of the invention, it will be recognized by one skilled in the art that various alternatives and embodiments of the elements of the invention are available and suitable. It is intended, therefore, that the invention be limited only as set forth in the claims appended hereto.

What is claimed:

1. A transportable system for the treatment of flowable waste water containing hydrocarbons and of a high level of biological oxygen demand, for the removal of hydrocarbons therefrom comprising a source of flowable waste water containing hydrocarbons and of a high biological oxygen demand, a reaction vessel defining a substantially vertically oriented path of travel for a plurality of flowable reactants countercurrently therethrough, said reaction vessel including an upper portion having a top end, a lower portion having a bottom end, and an intermediate portion, a collection basin surrounding and receiving therein said lower portion of said reaction vessel and supporting said reaction vessel therein, said collection basin defining a receptacle for the receipt of flowable waste water containing hydrocarbons from said source and flowable treated waste water effluent from said reaction vessel, means mounting said collection basin for ready transport from site to site, means anchoring said reaction vessel with said bottom end of said lower portion thereof disposed within said collection basin so that said collection basin and said reaction vessel are transportable as a unit, a quantity of discrete elements of a relatively inert packing material disposed within at least said intermediate portion of said reaction vessel, a biofilm disposed on the outer surface of said discrete elements of said packing material, said biofilm being capable of decomposing said hydrocarbons in said waste water, means defining a fluid flow path between said lower portion of said reaction vessel and said collection basin for the flow of treated flowable waste water effluent from said reaction vessel and into said collection basin so that said treated waste water effluent is mixed with said waste water in said collection basin to form a mixture of treated and untreated waste water in said collection basin, said mixture having a biological oxygen demand less than the biological oxygen demand of said waste water, pump means having an outlet and an inlet in fluid flow communication with said flowable waste water and said flowable treated waste water effluent disposed within said collection basin, a fluid flow inlet disposed within said upper portion of said reaction vessel, conduit means interconnecting said outlet of said pump means in fluid flow communication with said fluid flow inlet disposed in said upper portion of said reaction vessel so that operation of said pump means produces flow of said flowable waste water or mixture of waste water and treated waste water effluent from said collection basin through said fluid flow inlet and discharge of the same into the upper portion of said reaction vessel, whereupon said flowable waste water or mixture of waste water and treated waste water effluent trickles down through said biofilm-coated packing material within said reaction vessel to expose said hydrocarbons within said flowable waste water or mixture of waste water and treated waste water effluent to said biofilm and resultant decomposition of at least a portion of said hydrocarbons, an air mover disposed adjacent said reaction vessel and in fluid flow communication with the interior of said reaction vessel at a location below said packing material so that operation of said air mover introduces ambient air into said reaction vessel and forces the same upward through said packing material and its associated biofilm within said reaction vessel and out of said reaction vessel at a location adjacent the top end of the upper portion thereof, simultaneously with, and concurrent to, the trickle down of said flowable waste water or mixture of waste water and treated waste water effluent through said packing material, to provide oxygen to said biofilm, to retard the rate of trickle down of said flowable waste water or mixture of waste water and treated waste water effluent, and to sweep from the reaction vessel gaseous hydrocarbons entrained in the waste water or mixture of waste water and treated waste water effluent and/or gaseous reaction products from the decomposition of the hydrocarbons contained within said waste water or mixture of waste water and treated waste water effluent, fluid transfer means interconnecting said source of waste water into said collection basin, including flow control means, control means for effecting selective operation of said air mover, said flow control means associated with said transfer of waste water to said collection basin, and said pump means for the movement of waste water or mixture of waste water and treated waste water effluent from said collection basin to said upper portion of said reaction vessel, said control means being associated with said means for mounting said collection basin so that said control means is transportable with said collection basin, means for controlling the flow of said flowable waste water or mixture of waste water and treated waste water effluent from said lower portion of said reaction vessel into said collection basin, so that treated waste water or mixture of waste water and treated waste water effluent trickling down through said reaction vessel is readmitted to said collection basin to reduce the overall biological oxygen demand of said mixture of waste water and treated waste water effluent disposed within said collection basin, and means defining a discharge outlet means for said collection basin and including valve means for the control of discharge of flowable mixture of waste water and treated waste water effluent from said collection basin.

2. The system of claim 1 wherein said means for controlling the flow of said flowable mixture of waste water and treated waste water effluent from said bottom end of said lower portion of said reaction vessel into said collection basin includes a gravitationally-controlled discharge member connected in operative relationship to said means defining a fluid flow path between said lower portion of said reaction vessel and said collection basin.

3. The system of claim 2 and including a sampling device for the retrieval of a sample of said flowable mixture of waste water and treated waste water effluent, and wherein said gravitationally-controlled discharge member comprises a first conduit leading from the bottom end of said lower portion of said reaction vessel, said conduit including an opening therein which provides access to said flowable mixture of waste water and treated waste water effluent within said conduit by said sampling device.

4. The system of claim 3 and including control means for selectively withdrawing a sample of the flowable mixture of waste water and treated waste water effluent contained within said collection basin.

5. The system of claim 1 and including a further reaction vessel and an associated further collection basin which are essentially duplicates of said reaction vessel and its associated collection basin, and means interconnecting said further collection basin of said further reaction vessel to said source of waste water containing hydrocarbons, said further reaction vessel and its associated further collection basin being commonly mounted with said reaction vessel and its associated collection basin for ready transport from site to site.

6. The system of claim 5 and wherein said means interconnecting sa-d further collection basin of said further reaction vessel to said collection basin of said reaction vessel comprises a conduit disposed in fluid flow communication between said collection basin and said further collection basin.

7. The system of claim 5 wherein said control means includes means for effecting operational control over said further reaction vessel and its associated operative components substantially independent of the operational control over said reaction vessel.

8. The system of claim 1 wherein said means for controlling the flow of said flowable waste water or mixture of waste water and treated waste water effluent from said lower portion of said reaction vessel into said collection basin includes an outlet means disposed at a location above the fluid level of said flowable waste water or mixture of waste water and treated waste water effluent disposed within said collection basin.

9. A system for the treatment of flowable waste water containing hydrocarbons and of a high level of biological oxygen demand, for the removal of hydrocarbons therefrom comprising a source of flowable waste waster containing hydrocarbons and of a high biological oxygen demand, at least one reaction vessel defining a substantially vertically oriented path of travel for a plurality of flowable reactants countercurrently therethrough, said reaction vessel including an upper portion having a top end, a lower portion having a bottom end, and an intermediate portion, a collection basin surrounding and receiving therein said lower portion of said reaction vessel and supporting said reaction vessel therein, said collection basin defining a receptacle for the receipt of flowable waste water containing hydrocarbons from said source and flowable treated waste water effluent from said reaction vessel, means anchoring said reaction vessel with said bottom end of said lower portion thereof disposed within said collection basin so that said collection basin and said reaction vessel comprise a unit, a quantity of discrete elements of a relatively inert packing material disposed within at least said intermediate portion of said reaction vessel, a biofilm disposed on the outer surface of said discrete elements of said packing material, said biofilm being capable of decomposing said hydrocarbons in said waste water, means defining a fluid flow path between said lower portion of said reaction vessel and said collection basin for the flow of treated flowable waste water effluent from said reaction vessel and into said collection basin so that said treated waste water effluent is mixed with said waste water in said collection basin to form a mixture of treated and untreated waste water in said collection basin, said mixture having a biological oxygen demand less than the biological oxygen demand of said waste water, pump means having an outlet and an inlet in fluid flow communication with said flowable waste water and said flowable treated waste water effluent disposed within said collection basin, a fluid flow inlet disposed within said upper portion of said reaction vessel, conduit means interconnecting said outlet of said pump means in fluid flow communication with said fluid flow inlet disposed in said upper portion of said reaction vessel so that operation of said pump means produces flow of said flowable waste water or mixture of waste water and treated waste water effluent from said collection basin through said fluid flow inlet and discharge of the same into the upper portion of said reaction vessel, whereupon said flowable waste water or mixture of waste water and treated waste water effluent trickles down through said biofilm-coated packing material within said reaction vessel to expose said hydrocarbons within said flowable waste water or mixture of waste water and treated waste water effluent to said biofilm and resultant decomposition of at least a portion of said hydrocarbons, an air mover disposed adjacent said reaction vessel and in fluid flow communication with the interior of said reaction vessel at a location below said packing material so that operation of said air mover introduces ambient air into said reaction vessel and forces the same upward through said packing material and its associated biofilm within said reaction vessel and out of said reaction vessel at a location adjacent the top end of the upper portion thereof, simultaneously with, and concurrent to, the trickle down of said flowable waste water or mixture of waste water and treated waste water effluent through said packing material, to provide oxygen to said biofilm, to retard the rate of trickle down of said flowable waste water or mixture of waste water and treated waste water effluent, and to sweep from the reaction vessel gaseous hydrocarbons entrained in the waste water or mixture of waste water and treated waste water effluent and/or gaseous reaction products from the decomposition of the hydrocarbons contained within said waste water or mixture of waste water and treated waste water effluent, fluid transfer means interconnecting said source of waste water to said collection basin, including flow control means, control means for effecting selective operation of said air mover, said flow control means associated with said transfer of waste water to said collection basin, and said pump means for the movement of waste water or mixture of waste water and treated waste water effluent from said collection basin to said upper portion of said reaction vessel, means for controlling the flow of said flowable waste water or mixture of waste water and treated waste water effluent from said lower portion of said reaction vessel into said collection basin, so that treated waste water or mixture of waste water and treated waste water effluent trickling down through said reaction vessel is readmitted to said collection basin to reduce the overall biological oxygen demand of said mixture of waste water and treated waste water effluent disposed within said collection basin, and means defining a discharge outlet means for said collection basin and including valve means for the control of discharge of flowable mixture of waste water and treated waste water effluent from said collection basin.

10. The system of claim 9 wherein said means for controlling the flow of said flowable mixture of waste water and treated waste water effluent from said bottom end of said lower portion of said reaction vessel into said collection basin includes a gravitationally-controlled discharge member connected in operative relationship to said means defining a fluid flow path between said lower portion of said reaction vessel and said collection basin.

11. The system of claim 10 and including a sampling device for the retrieval of a sample of said flowable mixture of waste water and treated waste water effluent, and wherein said gravitationally-controlled discharge member comprises a first conduit leading from the bottom end of said lower portion of said reaction vessel, said conduit including an opening therein which provides access to said flowable mixture of waste water and treated waste water effluent within said conduit by said sampling device.

12. The system of claim 9 and including a further reaction vessel and an associated further collection basin which are essentially duplicates of said reaction vessel and its associated collection basin, and means interconnecting said further collection basin of said further reaction vessel to said source of waste water containing hydrocarbons, said further reaction vessel and its associated further collection basin being commonly mounted with said reaction vessel and its associated collection basin for ready transport from site to site.

13. The system of claim 12 and wherein said means for interconnecting said further collection basin of said further reaction vessel to said collection basin of said reaction vessel comprises a conduit disposed in fluid flow communication between said collection basin and said further collection basin.

14. The system of claim 12 wherein said control means includes means for effecting operational control over said further reaction vessel and its associated operative components substantially independent of the operational control over said reaction vessel.

15. The system of claim 9 wherein said means for controlling the flow of said flowable waste water or mixture of waste water and treated waste water effluent from said lower portion of said reaction vessel into said collection basin includes an outlet means disposed at a location above the fluid level of said flowable waste water or mixture of waste water and treated waste water effluent disposed within said collection basin.

16. A process for the treatment of waste water containing hydrocarbons of a high level of biological oxygen demand for the removal of hydrocarbons from the waste water including the steps of mounting a reaction vessel including an upper portion having a top end, a lower portion having a bottom end, and an intermediate portion, a biofilm-bearing packaging material disposed within at least said intermediate portion, in a substantially vertical attitude and with its bottom end disposed within a surrounding collection basin containing a quantity of waste water from a source of waste water containing hydrocarbons of a high level of biological oxygen demand, and defining a substantially vertically oriented path of travel for a plurality of flowable reactants countercurrently therethrough, on a platform for transport of the reaction vessel from site to site, transporting a quantity of said waste water from said collection basin to said top end of said upper portion of said reaction vessel and introducing said quantity of waste water into said upper portion in a dispersed pattern so that said waste water trickles down through said packing material, is exposed to said biofilm so that hydrocarbons within said waste water are decomposed by said biofilm, and thereafter flows from the lower portion of said reaction vessel and reenters said collection basin, admitting ambient air into said lower portion of said reaction vessel at a pressure sufficient to cause said air to flow upwardly through said packing material and out of said reaction vessel at the upper portion thereof, countercurrent to the flow of said waste water so as to supply oxygen to said biofilm, to retard the flow of said waste water through said packing material, and to sweep gaseous materials from said waste water and/or gaseous byproducts of the decomposition of said hydrocarbons, from said reaction vessel, monitoring the biological oxygen demand level of the waste water within said collection basin, and recycling said waste water through said reaction vessel until said biological oxygen demand of the waste water is reduced to a preselected level.

17. The method of claim 16 and including the step of, when said biological oxygen demand of said waste water within said collection basin has reached said preselected level, discharging at least a portion of said waste water from said collection basin, and introducing into said collection basin further waste water from the source of waste water having a high level of biological oxygen demand.

18. The method of claim 16 and including the steps of periodically sampling the biological oxygen demand of said waste water within said collection basin, comparing the biological oxygen demand of the sampled waste water with a preselected range of levels of biological oxygen demand, and discharging waste water from said collection basin when said biological oxygen demand level of the waste water within the collection basin is within the preselected range of biological oxygen demand levels.

19. The method of claim 16 wherein said waste water is introduced continuously to said collection basin, said waste water is recycled continuously through from said collection basin through said reaction vessel, and the flowable contents of said collection basin are continuously withdrawn from said collection basin.

* * * * *